Aug. 25, 1925.
A. H. OLSSON
WAVE POWER GENERATOR
Filed July 3, 1922   3 Sheets-Sheet 1
1,551,113
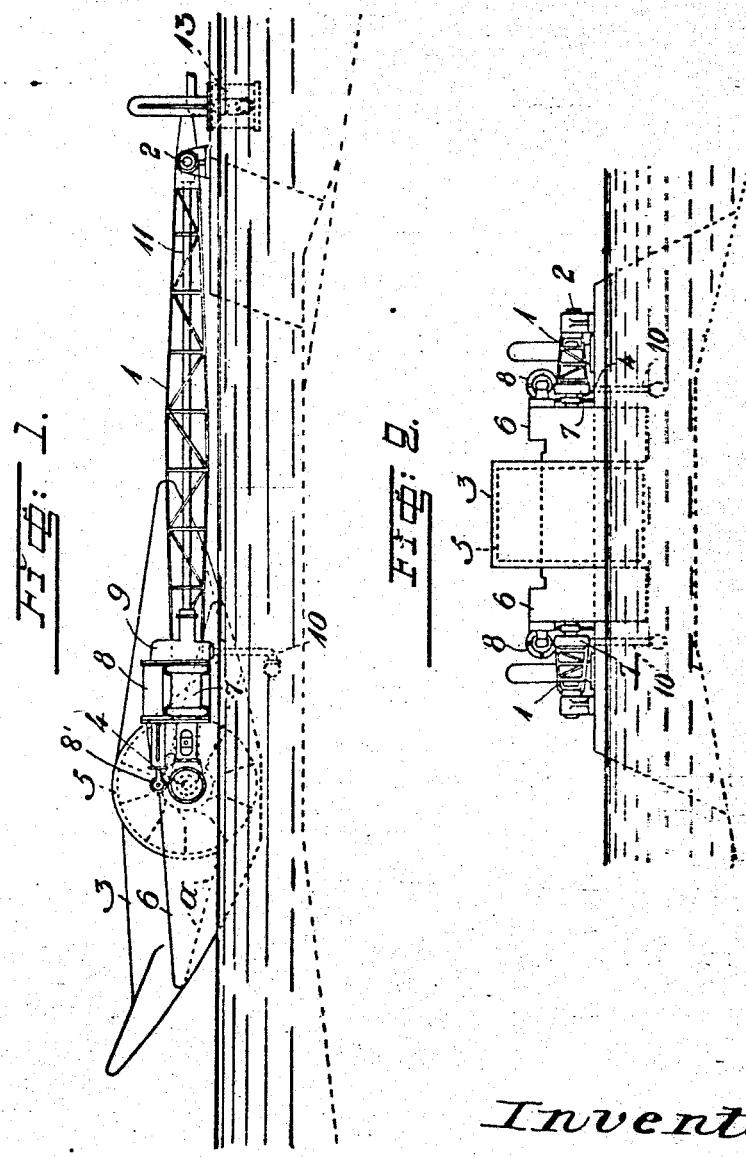
Inventor
A. H. Olsson,
By Marks&Clerk
Attys.

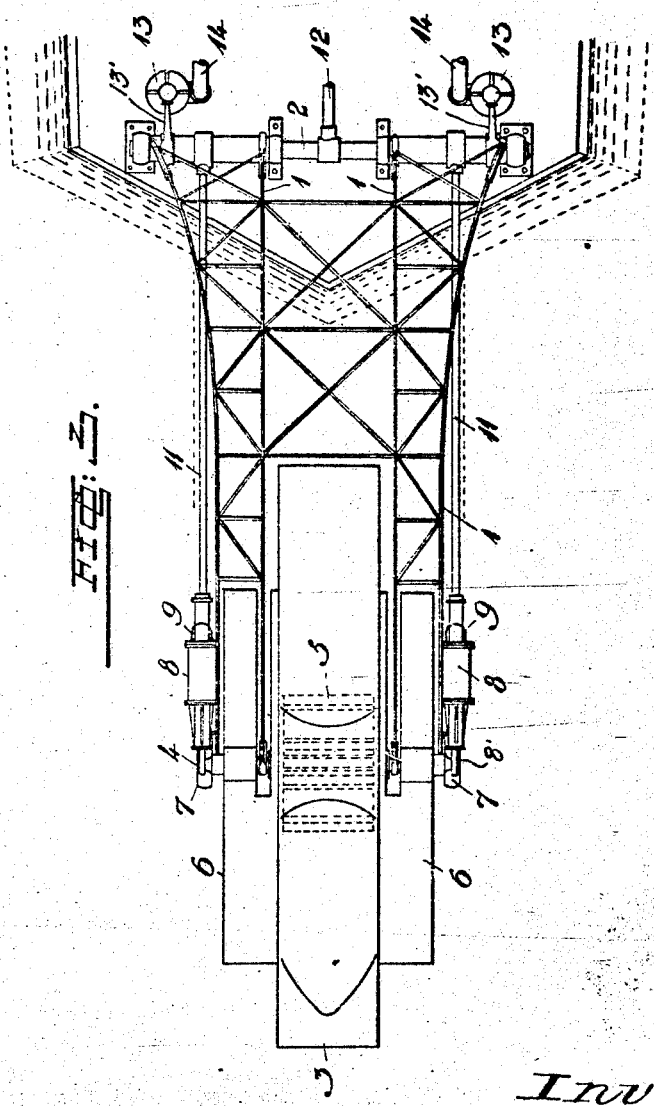

Patented Aug. 25, 1925.

1,551,113

UNITED STATES PATENT OFFICE.

ANDERS HILMER OLSSON, OF LIDKOPING, SWEDEN.

WAVE POWER GENERATOR.

Application filed July 3, 1922. Serial No. 572,655.

*To all whom it may concern:*

Be it known that I, ANDERS HILMER OLSSON, a subject of the King of Sweden, residing at Lidkoping, Sweden, have invented certain new and useful Improvements in Wave Power Generators, of which the following is a specification.

The recovery of the energy accumulated by the wind in the water waves rolling in toward the shores of seas and lakes is a problem of the utmost importance, particularly nowadays when the lack of coal is felt more and more inconvenient. Various methods for the solution of this problem have been suggested in the course of time, but, as far as is known, none of these proposed solutions has hitherto led to the result desired.

The present invention relates to a wave power generator which is constructed with respect to the nature of the wave motion and which, therefore, is believed to hold good in practice and to be capable of recovering the energy of the water waves in an entirely satisfactory manner.

It has been observed that in a wave motion in the water, the wave does not bring about any flow on the surface of the water if the depth of the water exceeds a certain value. If on the other hand the water is of a shallow depth the wave is caused to break, that is, a disturbance or stirring action takes place in the whole body of the wave from the bottom up to the surface which results in the flowing or surging laterally of the surface and in the strata of the water adjacent the surface. This flow is commonly known as breakage and it is to recover the energy from the breakers that the present invention is designed.

The invention may be said to consist briefly of one or more bucket wheels and of one or more floats, the latter being movably disposed with respect to the bucket- or turbine wheels and constructed in such manner that they will assume such a position relatively to the bucket- or turbine wheels, through the action of the waves, that a guiding device provided in the float or the floats, or suitably connected therewith, leads in the water onto the driving members of the wheels.

The arrangement is preferably carried out in such a fashion that the float or floats may be arranged so as to be rotatable on or co-axial with the axis of the bucket- or turbine wheel or wheels, the wave power generator being in its entirety mounted so that the depth under the turbine wheel, counted from the level of the quiet water, is equal to the average height of the wave-ridges occurring. The bottom, which has to be level underneath the turbine wheel, is shaped so as to be slanting from this place toward either side, in parallel to the direction of the wave motion.

Figure 4:
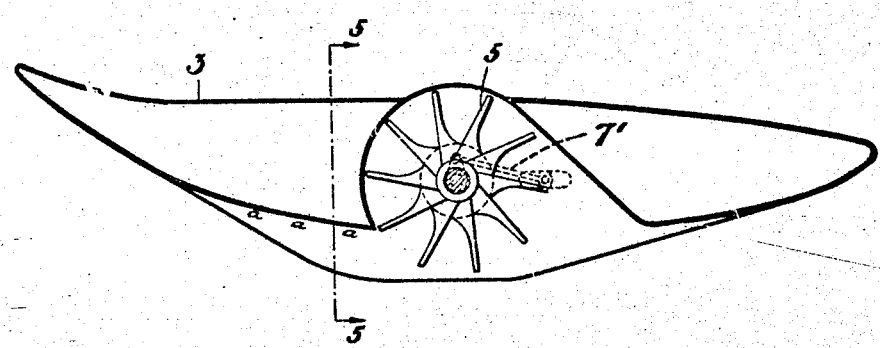
Figure 5:
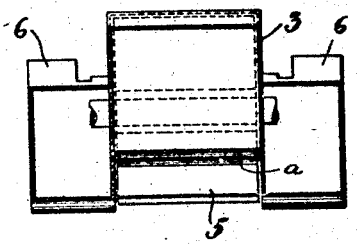

The accompanying drawing illustrates an embodiment of the invention: Fig. 1 shows the wave power generator in elevation; Fig. 2 is an end view thereof; Fig. 3 shows the same in plan view; Fig. 4 is an enlarged longitudinal sectional detail of one of the plates and the turbine wheel, and Fig. 5 is a transverse section taken on line 5—5 of Fig. 4 in the direction at which the arrow points.

The frame 1, which is movably connected with a shaft 2 mounted on a foundation, is extended over the surface of the water and is carried at its outer end by a float 3 which is rotatably mounted about the shaft 4. On the same shaft the turbine wheel 5 is attached and is arranged within a chamber in the float 3. A channel is also provided in the float and extends from the chamber to the seaward end of the float for guiding the water toward the wheel 5, the top of the channel being indicated at $a$. The outer portions 6 of the float are shaped as pontoons partly submerged in the water, and their displacements are calculated so that they can carry the free end of the whole wave power generator in such a manner that the lower portion of the surface of the float which is leading in the water toward the turbine wheel as indicated by the letter $a$ will be inwardly and downwardly inclined with respect to the level of the water when quiet. The turbine wheel is connected by means of a crank and piston rod arrangement 7′ direct to two double-acting pumps 7 located one on either side of the frame. Situated immediately above these pumps are two additional pumps 8, which are also double-acting, these latter pumps being connected direct to the float by means of the piston rods which are pivotally connected at the outer ends to the float as at 8′. The pumps 7 and 8 are each combined with and operate on the same valve chamber 9, from which the water is being sucked up through the pipes 10 and then pressed out through the pipes 11 and the shaft 2, which is provided with a bore hole, and through the pipe 12 communicating with a water reservoir or a water storer. The frame 1 is connected directly as by rods 13' with two double-acting pumps 13 delivering their water through the pipes 14 to the same reservoir as the pipes 12.

When a water wave is coming rolling toward the generator it will first hit the middle part of the float 3. The front portion of such middle part, which is so constructed that the waves can never "turn over", then adjusts itself after the forthrunning wave, which will result, partly in the float being swung around its axis so as to assume an oblique position with respect to its original position, and, partly in the float and, therefore, the free end of the whole generator being raised. The energy then developed is absorbed by the pumps 8 and 13 which are brought in action and press the water up in the reservoir. At the same time the wave is breaking, the mass of water being then suitably guided by the float toward the turbine wheel 3 so as to cause the latter to rotate. The pumps 7 are thus brought into operation so as to press water into the reservoir.

On the top of the wave-ridge having passed the axis 4 of the float, the latter is swung in the opposite direction and at the same time commences to sink. Pumps 8 and 13 are then again brought into operation, but in the reversed direction of movement.

The water reservoir may consist either of a free body of water situated at a suitable level above the wave power generator, or of a closed chamber into which the water is pressed under pressure. In both cases the energy may be easily recovered by means of common water motors which, evidently, may rotate at a constant speed. The energy of these motors may be consumed either immediately on the spot, or it may be transferred into electrical energy to be consumed at distant places.

To adapt the wave power generator for all waves within certain limits, it is found suitable to arrange the bottom under the turbine wheel adjustable for different depths so that the waves are always caused to break immediately above the turbine wheel.

In place of water pumps, air compression pumps may evidently be used as well. The water reservoir or water storer must then be replaced by an air storer from which the energy may then be recovered directly by suitable means adapted for the purpose in view, or this energy may be transferred to some other form of energy. The air pumps may also be permitted to operate directly on a mechanical accumulator of some kind which, in turn, transmits the energy obtained from the wave power generator directly into electrical energy.

It is obvious that the wave power generators which, as a rule, should be mounted at a comparatively short distance from shore, may be combined so that two or more of them operate on the same storer.

What I claim as new and desire to secure by Letters Patent of the United States of America is:—

1. A wave power generator including a pivoted frame, a turbine wheel on the outer end of the frame, a float supporting the frame and movable relatively to the turbine wheel, and a guide provided in the float, said float being responsive to the waves in such a manner that it will assume a position relative to the surface of the water so that the water is guided directly against the driving portion of the turbine wheel.

2. A wave power generator as claimed in claim 1, wherein the turbine is mounted on a shaft and the float is rotatable about the shaft.

3. A wave power generator as claimed in claim 1, wherein the surface of each float which leads the water to the turbine is in such a position above the water level when quiet that it will be substantially forwardly and downwardly inclined to the surface of the water.

4. A wave power generator as claimed in claim 1, wherein a fixed foundation is employed and wherein the frame has the inner end swingably connected with the foundation.

5. A wave power generator as claimed in claim 1, wherein a pair of pumps are arranged on opposite sides of the turbine, operable connections between the pumps and the axis of the turbine wheel and pressure pipes establishing communication between the pumps for conducting the water from the pumps to a receiver.

6. A wave power generator as claimed in claim 1, wherein a plurality of pumps are rigidly mounted on the frame, and operable connections between the pumps and the float whereby oscillations of the float in response to the motion of the waves effects operation of the pumps.

7. A wave power generator as claimed in claim 1, wherein a plurality of reciprocating pumps are employed, and connections between the frame and the pumps whereby the upward and downward movements of the frame are imparted to the pumps for operating the same.

In testimony whereof I affix my signature.

ANDERS HILMER OLSSON.